(12) United States Patent
Wilson

(10) Patent No.: US 9,306,751 B2
(45) Date of Patent: Apr. 5, 2016

(54) SECURE TIME AND CRYPTO SYSTEM

(71) Applicant: Kathie Wilson, Millbrae, CA (US)

(72) Inventor: Kathie Wilson, Millbrae, CA (US)

(*) Notice: Subject to any disclaimer, the term of this patent is extended or adjusted under 35 U.S.C. 154(b) by 0 days.

(21) Appl. No.: 13/874,252

(22) Filed: Apr. 30, 2013

(65) Prior Publication Data
US 2014/0321637 A1 Oct. 30, 2014

(51) Int. Cl.
*H04L 9/32* (2006.01)
*G09C 1/00* (2006.01)

(52) U.S. Cl.
CPC ............... *H04L 9/3247* (2013.01); *G09C 1/00* (2013.01); *H04L 9/3239* (2013.01)

(58) Field of Classification Search
CPC ....... G06F 21/88; G06F 21/86; H04L 9/3247; H04L 9/3239; G09C 1/00
USPC .......................................................... 380/28
See application file for complete search history.

(56) References Cited

U.S. PATENT DOCUMENTS

| | | | |
|---|---|---|---|
| 8,347,100 B1* | 1/2013 | Thornewell et al. ........... 713/176 |
| 2002/0048369 A1* | 4/2002 | Ginter et al. .................. 380/277 |
| 2002/0136410 A1* | 9/2002 | Hanna ........................... 380/277 |
| 2003/0204738 A1* | 10/2003 | Morgan ......................... 713/194 |
| 2006/0095795 A1* | 5/2006 | Nakamura et al. ............ 713/193 |
| 2006/0129821 A1* | 6/2006 | Zugenmaier ............ G06F 21/57 713/175 |
| 2006/0225142 A1* | 10/2006 | Moon ............................. 726/34 |
| 2007/0255966 A1* | 11/2007 | Condorelli et al. ............ 713/194 |
| 2010/0241848 A1* | 9/2010 | Smith et al. .................... 713/153 |
| 2011/0072506 A1* | 3/2011 | Law et al. ........................ 726/11 |
| 2012/0017090 A1* | 1/2012 | Gould et al. ................... 713/176 |
| 2012/0096166 A1* | 4/2012 | Devarapalli et al. .......... 709/226 |
| 2012/0117621 A1* | 5/2012 | Kondamuru ...... H04L 29/12066 726/3 |
| 2012/0131635 A1* | 5/2012 | Huapaya ................. H04L 9/088 726/1 |
| 2012/0278626 A1* | 11/2012 | Smith et al. .................... 713/176 |
| 2013/0346746 A1* | 12/2013 | Ghosh ................. H04L 63/0823 713/158 |
| 2014/0244998 A1* | 8/2014 | Amenedo ............. H04L 63/062 713/156 |
| 2014/0281643 A1* | 9/2014 | Tiri et al. ....................... 713/340 |
| 2014/0282887 A1* | 9/2014 | Kaminsky ........... H04L 61/1511 726/4 |

* cited by examiner

*Primary Examiner* — Joseph P Hirl
*Assistant Examiner* — J. Brant Murphy

(57) ABSTRACT

A system that performs time dependent cryptographic operations on input material resulting in outputs valid only over limited preconfigured life times to mitigate the security drawbacks of unattended operations while capturing the benefits of automation. Tamper protection circuitry is used to ensure the integrity of the system's internal independent source of time, cryptographic processor and key material. Configuration management of the system is authorized only after authenticated credentials held by multiple personnel are presented to the system.

3 Claims, 1 Drawing Sheet

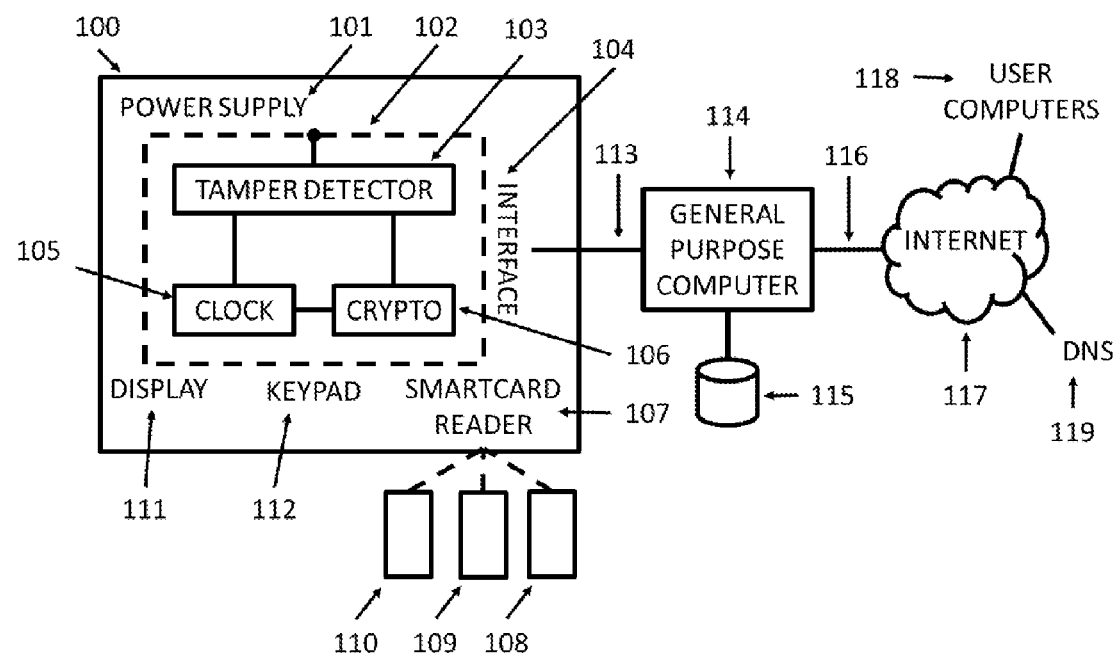

SECURE TIME AND CRYPTO SYSTEM

TECHNICAL FIELD

The present invention relates to the secure automation of the cryptographic operations required to maintain public key systems such as DNSSEC (Doman Name System Security Extensions) and PKIs (public key infrastructures) while minimizing the security drawbacks of unattended operations. More particularly, the present invention relates to a system which compensates for unattended automated cryptographic operations by limiting the useful life of digital signatures or other results created by the system or device implementing this invention based on overall operational considerations and trade-offs.

DESCRIPTION OF INVENTION

The increased reliance of society on the Internet has brought with it an increased need in securing it. This has spurred many efforts to protect data and other resources on the Internet through standard cryptographic means. This has included global efforts to protect the basic infrastructure of the Internet such as DNSSEC (Doman Name System Security Extensions) and PKIs (public key infrastructures) as well as market specific segments such as identity systems, media delivery systems and energy distribution. In all such systems cryptographic key material is used to encrypt and/or protect the integrity of data as it traverses the Internet. Protection of sensitive key material is a well-honed art however the management of such material is not, and is where difficulties arise. With the increased application of cryptography on the Internet to stem the tide of cyber-attacks, these difficulties have become a barrier to effective deployment.

Ideally, generation and use of sensitive key material should only occur under the supervision of those that would be accountable for its misuse which may often require the participation of multiple parties. However, for cryptographic operations that must occur on a regular basis, this is an impracticality and therefore at least the unattended, automated use of key material is allowed. Unfortunately for most operations the unattended use of the carefully protected key essentially nullifies any value derived from protecting the key in a secure device such as a hardware security module (HSM). This is particularly true for operations that are time sensitive and generate results purposely designed to be valid for limited time periods—e.g., digital signatures, digital certificates, etc. If an attacker can compromise the overall system making use of the protected key, he/she can command the device to generate a result good for an essentially infinite amount of time thus eliminating any value gained from protecting the key in a secure device (such as an HSM) and then lay waiting for an opportunity to attack.

To balance the practical need for automation against the need for secure key usage the present invention describes a device that combines an accurate, self-contained source of time with a cryptographic engine all within the same protective tamper responding envelope. Any unauthorized attempt to modify internal time settings or extract or misuse sensitive key material would be met with the same response (e.g., clearing, reset). Cryptographic operations that incorporate time are now checked inside the secure tamper envelope (via an interface protocol incorporating time unlike existing HSM APIs such as PKCS11) to see if they fall within preconfigured time periods and either performed or rejected. This guarantees that the extent of any system compromise, whether originating internally or externally, is limited to the time period configured inside the secure device. Configuration of the device as well as other infrequent operations such as key generation and backup are performed under the supervision of responsible parties in a non-automated, audited fashion. Acceptable time period settings are application dependent however due to the typically non-automated human process of dealing with anomalies (such as compromise recovery processes), a reasonable setting would cover at least the time it takes to recover plus safety margins, as well as personnel un-availability. Having such safety margins in place is critical to ensuring dependent systems do not fail while the problems are being fixed.

BRIEF DESCRIPTION OF DRAWINGS

FIG. 1 shows a diagram of a preferred embodiment of the present invention as part of an overall system.

PREFERRED EMBODIMENT

The preferred embodiment of the present invention consists of real time clock (105), reasonably accurate over at least the lifetime of the system (e.g., 10 years), attached to a processor responsible for performing cryptographic operations (106) such as key generation, encryption, decryption, hash calculation. Both are attached to tamper detection circuitry (103) that will zero-ize or clear settings and content in both clock and processor if it detects any attempts to pierce the tamper envelope (102) or subject the device to environmental extremes or other methods (e.g., x-ray, gamma ray, . . . etc) to try to modify or determine the contents of clock or crypto processor. Other elements that complete the unit include power supply (101), interface circuitry (104), display (111), keypad (112), and card reader (107) all encased in a suitable enclosure (100) to protect the tamper envelope from unintended tampering.

Configuration and initialization operations such as setting time, generating keys, setting validity periods and other parameters can only be performed once the crypto processor has determined that the authorizing personnel are present. This is accomplished through the use of two factor authentication credentials such as smart cards (108, 109, 110). In the preferred embodiment, the smart cards themselves are initialized at system commissioning and identify themselves to the device using a cryptographic handshake. The later allows for secure remote (110) authentication to the device to accommodate remote personnel. Requiring the card and PIN from at least two (2) responsible and accountable parties of the organization ensures that operations will always adhere to pre-defined organizational policies.

The application of the present invention in the preferred embodiment is to performing digital signature operations for DNSSEC. In this case a general purpose computer (114) must regularly sign records from a database (115) and publish them on the Internet (117). The digital signature is computed over both the record and the time period over which the signature will be valid. These digitally signed records and their contents are cryptographically validated by DNS servers and users on the Internet to verify the integrity of the contents—which may include other application specific key or certificate information itself. The global ubiquity of the Internet and its DNS make DNSSEC the world's only globally accessible, borderless, free, public key infrastructure which makes it an important candidate for the present invention.

Like many cryptographic systems, DNSSEC adds a layer of operational complexity that many IT departments are hesitant to take on. This has certainly been true for DNSSEC deployments and the consequences for "not getting it right" have been revealed by early adopters. In the majority of cases, the difficulties have surrounded the inability to keep time sensitive digital signatures from expiring. The reasons behind this are many and include simply the limitation on cost and personnel to monitor and maintain digital signatures. Solutions to these problems have ranged from remaining vulnerable by not deploying DNSSEC to generated exceeding long lived signatures in insecure environments. The later, due to lack of practice and attention, end up still expiring at inconvenient times and creating a long attack window. The present invention mitigates this barrier to deployment by reducing complexity and personnel costs by eliminating the need to manually update signatures or roll keys while limiting how long compromises (such as replay attacks) or key compromises are effective and providing a simple recovery path.

What is claimed:

1. An automated system to generate, maintain, and publish domain name system (DNS) security extensions (DNSSEC) in a trustworthy fashion without the need for regular Key Ceremonies comprising:

audited policies, processes, and procedures maximizing reliability, minimizing the effects of compromise, and maximizing trust;

a general purpose computer to sign and publish DNSSEC data on distributed DNS servers via the Internet for use by end users;

a device external to the general purpose computer and connected to the general purpose computer, to perform cryptographic operations enforcing the audited policies, the cryptographic operations comprising:

using a standalone time source, the standalone time source independent of external inputs;

combining a processor with the standalone time source to perform cryptographic operations;

tamper-protecting the standalone time source and the processor to levels required by the audited policies;

receiving data and an associated validity period to be processed;

executing requested cryptographic operations if the received associated validity period falls within a preconfigured range of the standalone time source, or, preventing execution of requested cryptographic operations if the received associated validity period does not fall within a preconfigured range of the standalone time source, the preconfigured range chosen to limit overall system compromise as per the audited policies and without the need for Key Ceremonies;

incorporating the received associated validity period in a result of any cryptographic operation to set an expiry according to the audited policies, such that the result may not be modified without detection;

zeroizing the standalone time source and key material used in cryptographic operations in response to any unauthorized tamper attempt to modify either of the standalone time source or the key material used in the cryptographic operations;

requiring two or more credentials to enable configuration of the standalone time source, the preconfigured range of the standalone time source, or the key material;

wherein the requested cryptographic operations correspond to a DNSSEC signature calculation and the received associated validity period corresponds to a DNSSEC signature validity period.

2. The system of claim 1, further comprising wherein the requested cryptographic operations consist of a calculation of a cryptographic hash of the received associated validity period, and data encrypted with a private half of a public-private asymmetric key pair.

3. The system of claim 1, further comprising wherein the requested cryptographic operations are any calculation that incorporates the received associated validity period in the result.

* * * * *